United States Patent [19]
Dickson

[11] Patent Number: 4,929,129
[45] Date of Patent: May 29, 1990

[54] KEY CUTTING APPARATUS

[76] Inventor: Russell A. Dickson, 5847 Venisota Rd., Venice, Fla. 34293

[21] Appl. No.: 255,453

[22] Filed: Oct. 11, 1988

[51] Int. Cl.⁵ .............................................. B23C 3/35
[52] U.S. Cl. ......................................... 409/81; 409/83
[58] Field of Search ................................ 409/81, 82, 83

[56] References Cited

U.S. PATENT DOCUMENTS

| | | | |
|---|---|---|---|
| 1,135,676 | 4/1915 | Engelbert | 409/81 |
| 1,889,461 | 11/1932 | Hansen | 409/82 |
| 1,948,260 | 2/1934 | Fowler | 409/82 |
| 2,176,106 | 10/1939 | Segal | 409/83 |
| 4,188,163 | 2/1980 | Juskevic | 409/82 |
| 4,526,498 | 7/1985 | Fieldhouse | 409/82 |

FOREIGN PATENT DOCUMENTS

| | | | |
|---|---|---|---|
| 1209847 | 1/1966 | Fed. Rep. of Germany | 409/81 |
| 2014492 | 10/1970 | Fed. Rep. of Germany | 409/81 |
| 73754 | 9/1960 | France | 409/81 |

Primary Examiner—Daniel Howell
Attorney, Agent, or Firm—Gifford, Groh, Sprinkle, Patmore and Anderson

[57] ABSTRACT

A key cutting apparatus for reproducing a pattern key onto a key blank while reproducing the pattern key without the copying errors and wear conventionally found on pattern keys. The cutting apparatus comprises a frame, a space adjusting portion movably attached to the frame, a depth adjusting portion movably attached to the space adjusting portion, and a cutter. A depth code plate and a space code plate are removably fitted to the space adjusting portion.

19 Claims, 3 Drawing Sheets

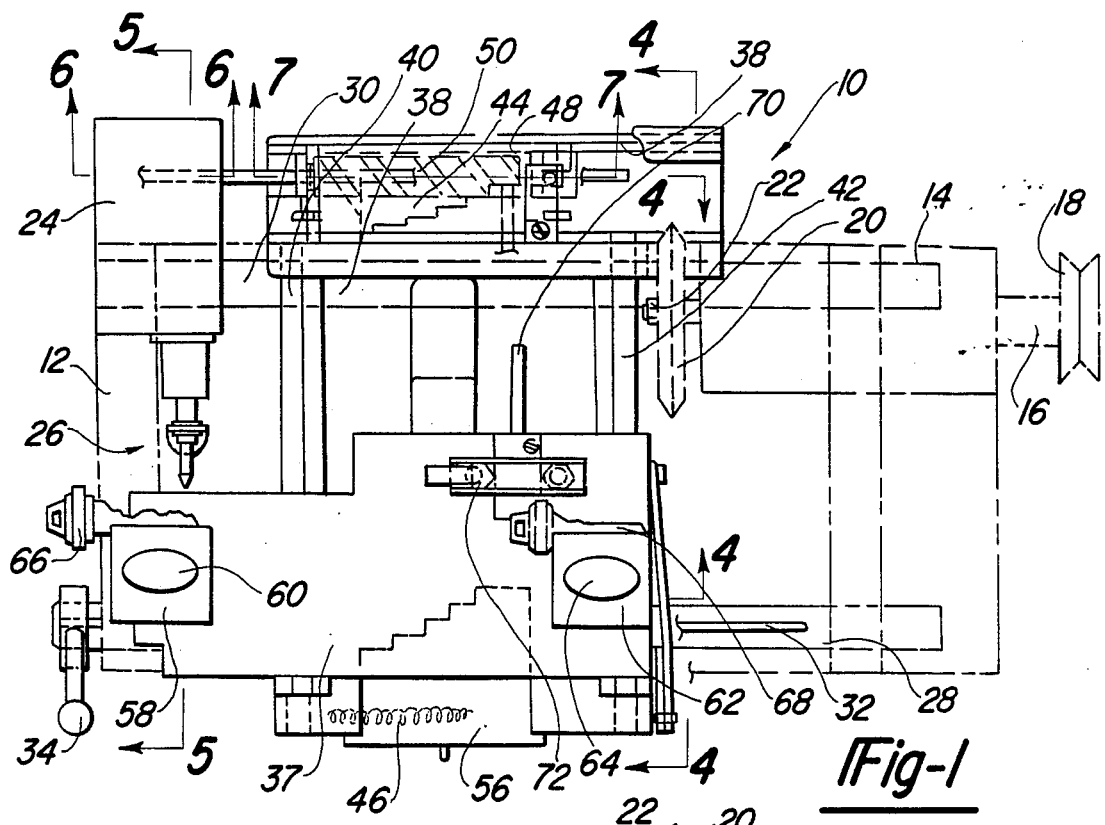
Fig-1
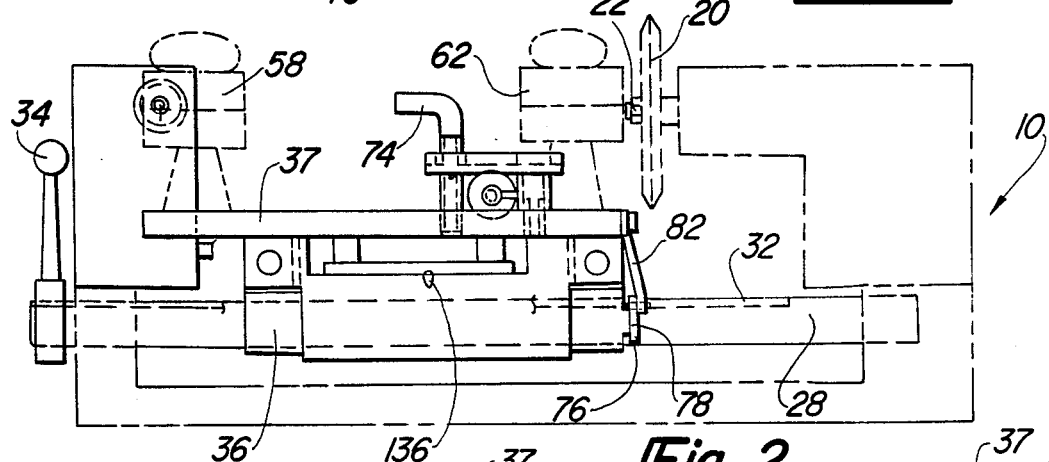
Fig-2
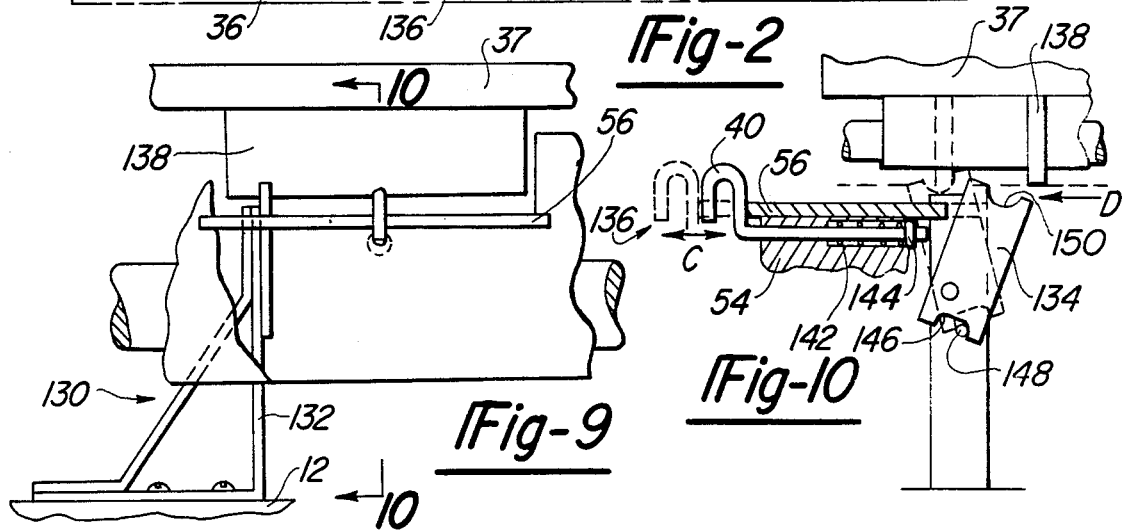
Fig-9
Fig-10

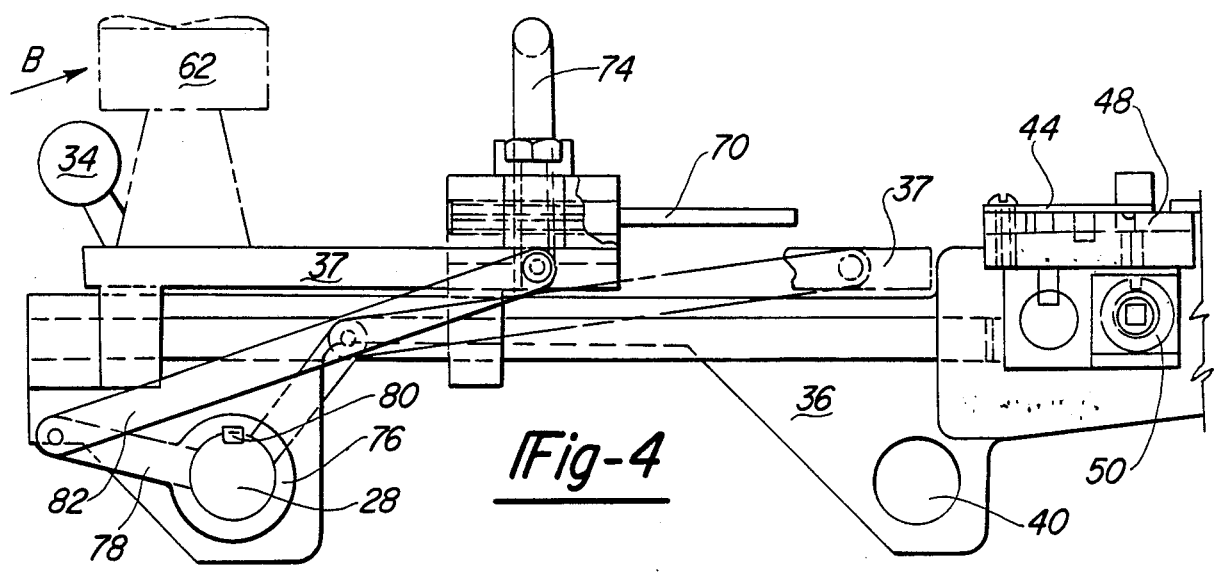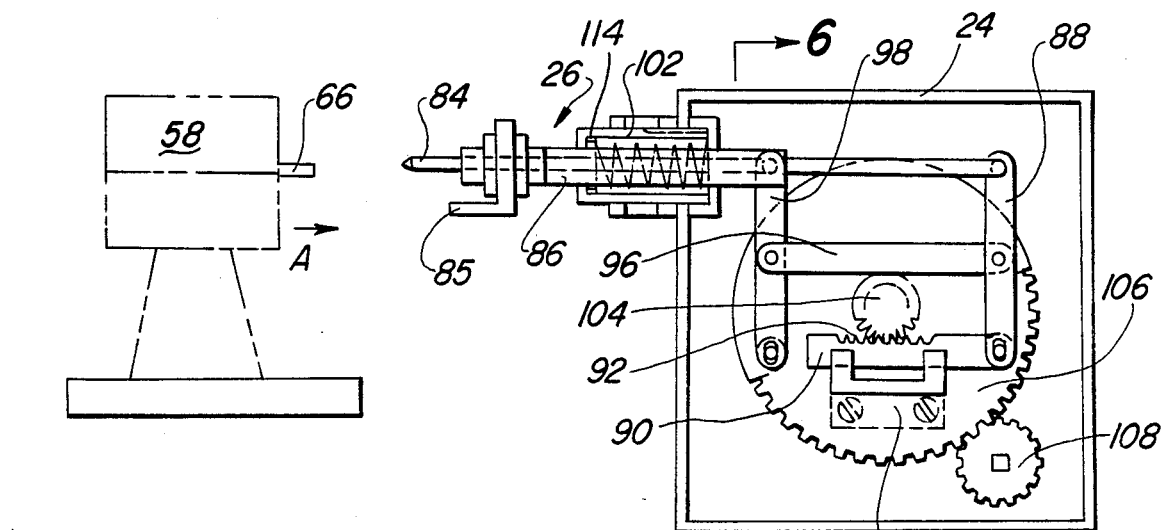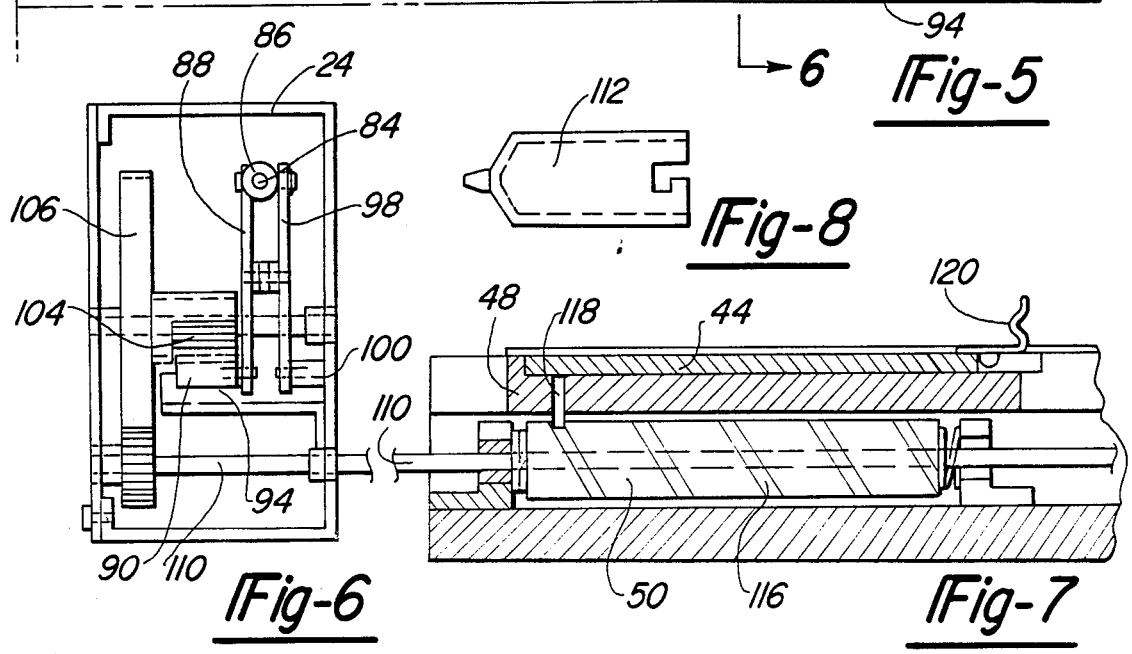

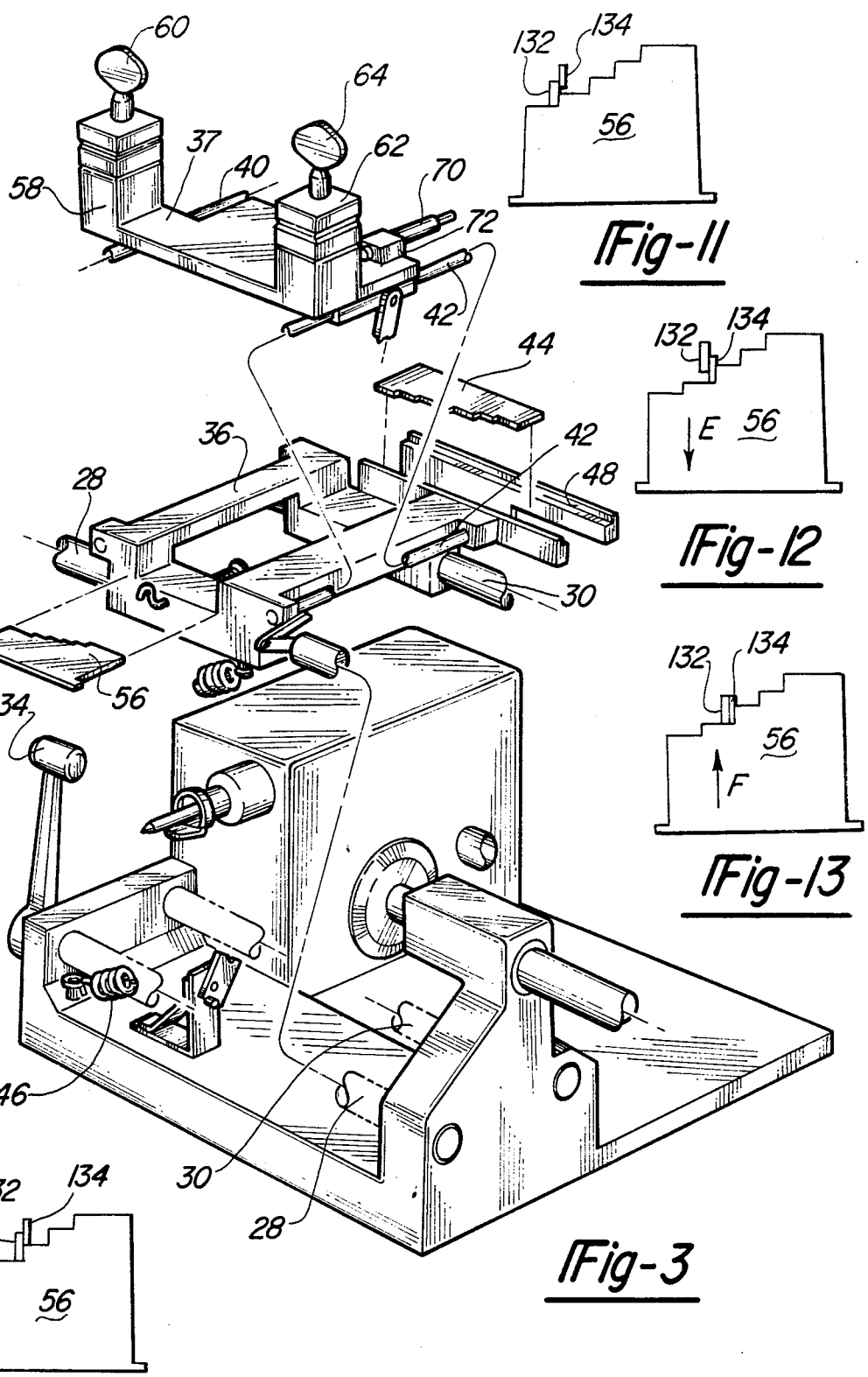

KEY CUTTING APPARATUS

BACKGROUND OF THE INVENTION

I. Field of the Invention

The present invention relates generally to key cutting machines. More particularly, the present invention relates to a key cutting machine capable of reproducing a pattern key onto a key blank while eliminating the wear and miscutting of the pattern key, thereby utilizing the advantages of key machines which operate by code operations.

II. Description of the Relevant Art

In a key cutting machine, conventional methods of cutting are old and well-known. There are presently known two types of cutting devices.

The first type utilizes a pair of vices, one for the pattern key and one for the key blank. A stylus is used to follow along the contour of the pattern key and reproduce the contour of the pattern key onto the key blank either by moving a cutter to notch the key blank or by moving the key blank to the cutter.

The second type utilizes a code system and a key blank. Rather than duplicating a key from a pattern, the code system cuts a key based upon known information including the depth and spacing of the serrated edge or edges. The code system may either be computer coded or coded from a card or a plate. A card system is disclosed in U.S. Pat. No. 4,188,163 issued in 1980 to Juskevic and entitled "KEY DUPLICATING MACHINE".

The first type suffers from known disadvantages. First, the copied key duplicates the pattern key exactly, and accordingly includes any copy errors or wear preset in the pattern key. Second, because the stylus follows the serrations with relative exactness, chatter (cutting) marks appear on the copied key. Both of these disadvantages result in poor lock operation and premature wear of the lock components.

The second type, while eliminating some problems of the first method, is impractical for general use in that it cannot copy a pattern key. This method is more properly suited for originating a key without a pattern.

Accordingly, prior inventions have failed to overcome the known disadvantages of duplicating machines.

SUMMARY OF THE PRESENT INVENTION

The present invention provides a key cutting machine for convenient and accurate copying of a key. The key cutting machine according to the present invention overcomes all of the above-mentioned disadvantages of the previously known cutting machines.

In brief, the present invention provides a key cutting machine for reproducing a pattern key onto a key blank while copying the pattern key without the duplicating errors and wear commonly associated with pattern keys.

The machine includes a main frame which has provided movably thereon a space adjusting portion. The space adjusting portion includes an interchangable depth code plate which rides on a depth code plate holder.

A depth adjusting portion is movably mounted on the space adjusting portion. The depth adjusting portion includes the pattern key holder, the key blank holder, and a depth stop rod for selective abutment with the depth code plate.

The carriage and hence, the plate, are adjusted by a measuring stylus which follows along the contour of the pattern key. Once the stylus bottoms out in a given cut of the serrated edge on the pattern key, the depth plate is fully adjusted. The depth plate compensates for worn depth or an improper cut by requiring the cutter to cut to a given depth, no more, no less, even if the cut of the pattern key is deeper or shallower.

The space adjusting portion also includes an interchangable space code plate. The space adjusting portion moves the key blank over to the next space, no more, no less, and thus aligns the blank key before the cutter even if the pattern key was cut with an improperly spaced dimension.

Both the depth code plate and the space code plate are masters which would accompany a specific brand of key. (Keys are cut to specific dimensions according to known values indicated by the key manufacturer.)

In the event that a key is to be cut without the benefit of the code plates, a stylus cover may be removably placed over the measuring stylus. Because the cover itself has a fixed stylus, the machine may be used in a conventional manner to copy a key.

The above and other objects, advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a top plan view of a key cutting machine according to the present invention in partial broken lines;

FIG. 2 is a side elevational view of the present invention also in partial broken lines;

FIG. 3 is an exploded perspective view of the present invention;

FIG. 4 is a sectional view taken along line IV—IV of FIG. 1;

FIG. 5 is a sectional view taken along line V—V of FIG. 1;

FIG. 6 is a sectional view taken along line VI—VI of FIG. 5;

FIG. 7 is a sectional view taken along line VII—VII of FIG. 1;

FIG. 8 is a side view of a fixed stylus cover for placement over the slidable stylus of the present invention;

FIG. 9 is a side view illustrating the space stop portion of the present invention;

FIG. 10 is a view taken along lines X—X of FIG. 9;

FIG. 11 is a top view illustrating the relationship between the space code plate, the pivotable stop plate and the fixed stop bar all according to the present invention;

FIG. 12 is a slightly altered view of FIG. 11;

FIG. 13 is a slightly altered view of FIG. 12; and

FIG. 14 is a slightly altered view of FIG. 13.

DETAILED DESCRIPTION OF THE PREFERRED EMBODIMENTS OF THE INVENTION

FIGS. 1–10 show a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, there is shown a top plan view of a key cutting machine according to the present invention, generally indicated as 10. The cutting machine 10 comprises a fixed frame 12 which may be fixedly attached to a table top, workbench, or the like (none shown). The frame 12 has fixedly mounted thereto a disk cutter mount 14 which includes a rotatable cutter shaft 16. The shaft 16 has attached to one end a conventional pulley 18 which is attachable to a motor (not shown). At the opposite end of the shaft 16 there is removably attached a conventional disk cutter wheel 20. The wheel 20 may be composed of cobalt, carbide steel or other material as preferred. The wheel 20 is removably attached by means of a lock nut 22 which allows for easy replacement and interchangability.

Also fitted to the frame is a transmission housing 24. The housing 24 houses components. Fixed on one side of the housing 24 is a stylus portion, generally indicated here as 26. The stylus portion 26 will be more fully and completely described below with respect to FIG. 5. The housing 24 houses components for transmitting movement of the stylus portion 26 to other portions of the key cutting machine 10 which will be described below.

The frame 12 also comprises a pair of axial shafts 28, 30. The shaft 30 is fixedly provided for support. The shaft 28 is rotatable, and includes an arm guide channel 32 axially defined therein. At one end of the shaft 28 is fitted a handle 34.

Slidably mounted upon the shafts 28, 30 is a movable code plate carriage generally indicated as 36. The code plate carriage 36 includes a pair of transverse shafts 40, 42. The code plate carriage 36 further comprises an interchangable multi-stepped depth code plate 44 and a carriage retainer spring 46.

Beneath the depth code plate 44 is a depth code plate mount 48 which rests on the code plate carriage 36. Beneath the mount 48 is rotatably provided a spirally channeled depth plate carriage drive roller 50. One end of the carriage drive roller 50 coacts with select internal components housed in the transmission housing 24 which will be subsequently described. At the opposite end of the code plate carriage 36 is an interchangable multi-stepped space code plate 56.

Slidably mounted on transverse shafts 40, 42 is a slidable depth stop carriage generally indicated as 37. Mounted on the depth stop carriage 37 are key holders which include a pattern key holder 58 with a locking knob 60 and a key blank holder 62 with a locking knob 64. Locked into the pattern key holder 58 is a sample pattern key 66. Locked into the key blank holder 62 is a sample key blank 68.

Removably and adjustably mounted on the depth stop carriage 37 is a depth stop bar 70. The bar 70 selectively abuts a certain one of the steps in the depth code plate 44 when the cutting machine 10 is operated as will be described more fully below. The depth stop bar 70 is releasably mounted into the depth stop bar holder 72.

Referring to FIG. 2, an elevational side view of the cutting machine 10 is illustrated from the operator's point of view. In this view, the pattern key holder 58 and the key blank holder 62 are more clearly shown. Also visible in this view is a depth stop bar locking handle 74.

The axial shaft 28 is also more clearly illustrated in FIG. 2, as is its arm guide channel 32 shown in broken lines. Slidably mounted on the axial shaft 28 is a collar 76 having an extending arm 78 and a key 80 (shown in FIG. 4) provided thereon. A movable arm 82 interconnects the depth stop carriage 37 with the extending arm 78.

FIG. 3 presents an exploded perspective view so that the cutting machine 10 may be more clearly understood.

Referring to FIG. 4 the action of the depth stop carriage 37 with respect to the code plate carriage 36 is illustrated. In its rest position, the handle 34 is pulled back, as illustrated. In this position, the extending arm 78 is also pulled back and, connected to the depth stop carriage 37 via the movable arm 82, the carriage 37 is also in its retracted position. When the handle 34 is pushed forward, the linkage of the extending arm 78 and the movable arm 82 coacts to push forward the carriage 37, thus carrying forward the pattern key 66 and the key blank 68. Broken lines are used to illustrate the carriage 37 in its extended position as driven forward by the combined effort of the extending arm 78 and the movable arm 82.

Referring to FIG. 5, when the handle 34 (shown in FIGS. 1 through 3) is pushed forward, the pattern key holder 58 rides forward on the carriage 37 in the direction indicated by arrow "A". The pattern key 66, carried by the pattern key holder 58, is moved to abut a slidable stylus shaft 84. The shaft 84 is slidably housed within a slidable stylus housing 86.

The shaft 84 is pivotally linked to a first upright bar 88 which is in turn pivotally linked to a slidable gear rack 90. The gear rack 90 has defined on one side a plurality of rack gear teeth 92. The gear rack 90 is slidably mounted on a rack slide 94.

At the approximate midpoint of the first upright bar 88 is pivotally attached a cross bar 96 which is itself pivotally attached to the approximate midpoint of a second upright bar 98. As can be seen more clearly in FIG. 6, the lower end of the second upright bar 98 is pivotally attached to a shoulder 100 provided on the inside of the transmission housing 24. The upper end of the second upright bar 98 is pivotally attached to an inner end 102 of the slidable stylus housing 86. Forward motion of the pattern key holder 58 causes the holder to coact with a stylus stop 85.

With reference still to FIG. 5, when the stylus shaft 84 is pressed upon by the pattern key 66, the coactable first upright bar 88 shifts, pivotally restrained by the cross bar 96, to slidably urge the slidable gear rack 90 to slide upon the rack slide 94. At this event, the rack gear teeth 92 coact with a secondary gear 104. The secondary gear 104 is fixed to a larger primary gear 106. The primary gear 106 in turn drives a carriage drive roller gear 108 which is extended from the carriage drive roller 50 by a roller shaft 110 (shown in FIGS. 6 and 7).

A stylus cover 112 (shown in FIG. 8) is removably provided for placement over the slidable stylus shaft 84 and the slidable stylus housing 86 by interlocking with a shaft housing 114. The placement of the cover 112 thereover mutes the movement of the stylus shaft 84 to allow conventional use of the cutting machine 10 as a duplicator without the need of either the depth code plate 44 or the space code plate 56 as will be described below.

With reference to FIGS. 6 and 7, a more detailed illustration of the roller 50 and its relationship generally to the transmission components and and the components of the carriage 36 is presented.

The carriage drive roller 50 has spirally defined therein a depth plate guide channel 116. A depth plate guide pin 118 is provided at the underside of the depth code plate mount 48. The pin 118 slidably follows the channel 116 on rotation of the roller 50 as described above. This rotating movement of the roller 50 causes the mount 48 to selectively move in one direction or the other. As the mount 48 moves, so too does the depth code plate 44 mounted therein and the code plate carriage 36. The depth code plate 44 is releasably locked in the mount 48 by a depth code plate locking clip 120.

With reference to FIGS. 9 and 10, a space stop portion, generally indicated by 130, is shown. The space stop portion 130 comprises the multi-stepped space code plate 56, a fixed stop bar 132 fixed to the fixed frame 12, a pivotable stop plate 134 pivotally attached to the fixed stop bar 132, a spring-loaded space plate key assembly 136 slidably mounted in the code plate carriage 36, and a stop plate trip plate 138 fixed to the underside of the depth stop carriage 37.

With reference particularly to FIG. 10, the spring-loaded space plate key assembly 136 includes a key 140, a key spring 142 and a circlip 144. The circlip 144 retains the key spring 142 in position. The key 140 is capable of being pulled away from the plate carriage 36 and subsequently twisted to thereby allow for removal and interchanging of the space code plate 56. This motion is illustrated by arrows "C". The withdrawn position of the key 140 is illustrated in broken lines.

Still with reference to FIG. 10, the space stop portion 130 is illustrated to detail the structure of the pivotable stop plate 134 and its relation to the fixed stop bar 132. The stop plate 134 has a lower recessed area 146 and an upper recessed area 150. The lower recessed area 146 limits the pivoting motion of the pivotable stop plate 134 by pin 148. A second stopped position of the plate 134 is illustrated in broken lines. Accordingly, the extreme positions of the stop plate 134 are illustrated.

The upper recessed area 150 is selectively defined so as to accomodate the lower end portion of the stop plate trip plate 138. When the trip plate 138 moves in the direction indicated by arrow "D", the end portion of the trip plate 138 catches in the recessed area 150 of the stop plate 134. Continuing its motion in the direction indicated by arrow "D", the trip plate 138 pushes the stop plate 134 so that it pivots on the fixed stop bar 132. When the trip plate 138 is moved to its extreme opposite position as indicated by broken lines, the stop plate 134 is concurrently moved to its extreme opposite position, as also indicated by broken lines. This motion forces the space code plate 56 in the direction of arrow "D", such motion being allowed by the resilient force of the spring-loaded space plate key assembly 136.

OPERATION OF THE PRESENT INVENTION

The operator first clamps the pattern key 66 into the pattern key holder 58. The pattern key 66 is locked into the pattern key holder 58 so that the serrated edge of the key 66 faces outward toward the stylus portion 26. The key blank 68 is inserted into the key blank holder 62 and the key blank 68 is positioned so the blank edge to be cut is facing the cutter wheel 20.

Naturally, as is conventionally known, the key blank 68 is selected as being of the same brand and style as the pattern key 66. Similarly, the depth code plate 44 and the space code plate 56 are selected as being for the brand of the pattern key 66. Because the various cutting depths and spacing of a key are standard according to each brand of key, a pair of depth and space code plates may be selected for a given brand, and the depth of cut in the pattern key 66 will be ultimately controlled by the depth code plate 44 while the spacing will be ultimately controlled by the space code plate 56. In this way, the worn and miscut key will be corrected as it is embodied in the key blank 68.

Once the depth code plate 44 and the space code plate 56 are respectively installed, the machine 10 is thus prepared to commence decoding the pattern key to be reproduced. The motor (not shown) is switched on, thus engaging the cutter wheel 20. The operator then moves the handle 34 forward as indicated by arrow "B" shown in FIG. 4. By so moving, the movable depth stop carriage 37 is moved forward for the pattern key 66 to touch the stylus shaft 84. According to the action and coaction described above with respect to FIGS. 5 through 7, the shaft 84 is depressed causing the roller 50 to rotate. Following its channeled course in the roller 50, the depth code plate 44 travels to align one step of the depth code plate 44, being multi-stepped as shown in FIGS. 1 and 3, with the depth stop bar 70. The step selected by the alignment action represents the specific depth to which the cutter wheel 20 will produce a cut in the key blank 68. The depth, by being returned to known factory standards, thus is compensated for wear which operationally affects the troughs of the serrated edge.

The depressed action of the stylus shaft 84 ceases when the pattern key holder 58 abuts the stylus stop 85. At this time the selection of the proper depth is complete, and the selected step of the depth code plate is properly aligned with the depth stop bar 70.

Forward motion by the operator of the handle 34 continues, and the pattern key 66, the stylus shaft 84, the stylus stop 85, and the stylus housing 86 (to which the stylus stop 85 is fixedly attached) continue moving forward (away from the operator) as a unit. As advancement continues, the cutter wheel 20 cuts into the key blank 68 until the depth stop bar 70 contacts the selected step of the depth code plate 44. The handle 34 has thus reached its maximum forward position, and the single cut is fully made.

To proceed to the next cut in the key, the handle 34 is pulled back toward the operator. This action draws the depth stop carriage 37 back, or toward the operator. In so moving, the stop plate trip plate 138 engages and moves the pivotable step plate 134 in the manner described above with respect to FIGS. 9 and 10. The consequential action of this maneuver is that the stop plate 134 is brought to abut the next step of the stepped space code plate 56 as illustrated in FIG. 11.

With respect to FIG. 12, further advancement of the stop plate 134 in the direction of arrow "E" as an indirect consequence of continual backward motion of the handle 34 releases the fixed stop bar 132 from the code plate 56 by pushing the code plate 56 in the direction of arrow "E". This represents the result of the most extreme rearward motion of the handle 34.

Referring now to FIG. 13, a slight forward motion of the handle 34 results in the stop plate 134 being brought forward, away from the operator, in the direction indicated by arrow "F" until the code plate 56 abuts the fixed stop bar 132. The stop bar has been thus moved to the next space step of the space code plate 56.

In FIG. 14, the handle 34 is moved slightly forward from its extreme position which results in the arrangement illustrated in FIG. 12. As a result, the pivotable stop plate 134 has also been moved forward to clear the space code plate 56.

The cutting machine 10 thus completes one complete cutting and spacing cycle. The slight forward motion of the handle 34 is stopped and ready for complete forward motion to achieve the next cutting and spacing cycle.

I claim:

1. A key cutting apparatus for cutting a blank key substantially from the cut dimensions of a pattern key comprising:
   a frame portion having two sides, a back and a front;
   a first movable portion mounted on said frame portion having a depth plate and a space plate removably mounted thereon, said first movable portion being movable side to side;
   a second movable portion mounted on said first movable portion, said movable portion providing forward and backward motions for depth control;
   means for cutting said blank key mounted on said frame portion;
   a telescoping stylus portion capable of following along by telescoping action the serrations of said pattern key; and
   means for transmitting said telescoping action of said stylus portion to said depth plate and for adjusting said depth plate.

2. A key cutting apparatus comprising:
   a fixed frame;
   a space adjusting portion movably attached to said frame;
   a depth adjusting portion movably attached to said space adjusting portion;
   means fitted to said depth adjusting portion for holding a pattern key having one or more serrations and a blank key;
   means for cutting said blank key fitted to said fixed frame;
   means for measuring the depth of each serration of said pattern key; and
   means for transmitting said measured depth of each of said serrations to said depth adjusting portion and for making a depth adjustment thereof;
   means for translating said measurement into motion for adjusting said depth adjusting portion.

3. A key cutting apparatus according to claim 2 wherein said fixed frame comprises a first shaft and a second shaft, said first shaft being rotatable and having a first end and a second end, said first end having a handle mounted thereon and said second end having a movable arm pivotably attached to said depth adjusting portion whereby said arm advances and retracts said depth adjusting portion.

4. A key cutting apparatus according to claim 2 wherein said space adjusting portion comprises a depth code plate mount having a top and a bottom, said plate mount having at least one guide pin provided thereunder, said plate mount having an interchangable depth code plate removably mounted thereon.

5. A key cutting apparatus according to claim 2 wherein said means fitted to said depth adjusting portion for holding said pattern key and said blank key further includes means for releasably receiving said keys.

6. A key cutting apparatus according to claim 4 wherein said depth code plate is interchangeable with other depth code plates.

7. A key cutting apparatus according to claim 4 wherein said space adjusting portion comprises:
   a multi-stepped space plate removably fitted to said space adjusting portion;
   a fixed space plate stop bar fixed to said frame;
   a pivotable space plate trip arm pivotably mounted to said space plate stop bar;
   said trip bar being aligned to selectively pivot said pivotable space plate trip arm;
   a multi-stepped depth code plate removably fitted to said space adjusting portion; and
   a depth plate drive roller having a spiral drive channel defined therein for slidably accomodating said guide pin, said drive roller having a first end and a second end.

8. A key cutting apparatus according to claim 7 wherein said space plate is interchangeable with other space plates.

9. A key cutting apparatus according to claim 7 wherein said space adjusting portion further comprises a rotatable, spring-loaded key member for urging said space plate against said space adjusting carriage.

10. A key cutting apparatus according to claim 2 wherein said means for measuring the serrations of said pattern key comprises:
    a shaft capable of linear motion having a first end and a second end;
    a stylus provided on said first end of said shaft;
    a shaft housing within which said shaft is substantially provided; and
    a stylus stop plate fitted to said shaft housing.

11. A key cutting apparatus according to claim 10 wherein said means for measuring the serrations of said pattern key further comprises:
    a stylus cover for muting said measuring of said serrations; and
    means for removably attaching said cover to said shaft housing.

12. A key cutting apparatus according to claim 7 wherein said space adjusting portion further includes one or more shafts; and
    said depth adjustment portion further comprises a slidable depth stop carriage, said depth stop carriage being slidably provided on said one or more shafts.

13. A key cutting apparatus according to claim 12 wherein said depth stop carriage further includes a depth stop bar selectively abuttable with said multi-stepped depth plate.

14. A key cutting apparatus according to claim 13 wherein said depth adjusting portion includes a locking handle for adjustably fitting said stop bar on said depth stop carriage.

15. A key cutting apparatus according to claim 10 wherein said means for translating comprises:
    a main drive gear capable of rotary motion and having a first side and a second side; and means for transferring said linear motion of said shaft to said rotary motion of said main drive gear;
said means for transferring comprises:
a pinion gear having a diameter less than that of said main drive gear and being mounted to said first side of said main drive gear;
a rack gear coactable with said pinion gear; and
a plurality of interrelated pivotable arms interconnecting said shaft with said rack gear;
said arms including a pair of first spaced apart substantially vertical arms, said first arms being substantially in parallel with one another;
said arms further including a third arm substantially traversing and interconnecting said first vertical arms; and
said arms further including a fourth arm, said fourth arm being pivotably interconnected with one of said pair of first spaced apart arms, said fourth arm having said rack gear defined thereupon.

16. A key cutting apparatus according to claim 15 including a depth plate drive roller, wherein said first end of said drive roller includes an end gear, said end gear being coactable with said main drive gear.

17. A key cutting apparatus according to claim 15 wherein said means for transferring further comprises a housing structure having an aperture for slidably substantially receiving said shaft housing.

18. A key cutting apparatus according to claim 12 wherein said depth stop carriage has apertures defined therein for slidably coacting with said one or more shafts of said space adjusting portion.

19. A key cutting apparatus comprising:
a fixed frame structure;
a lower movable frame assembly movably attached to said fixed frame structure, said fixed frame structure having attached thereto a space stop arm;
an upper movable frame assembly movably attached to said lower movable frame assembly, said upper movable frame assembly having attached thereto a depth stop arm;
a pattern key holder fixed to said upper movable frame assembly for removably holding a serrated pattern key;
a blank key holder fixed to said upper movable frame assembly for removably holding a key blank;
means for cutting said blank key provided on said fixed frame structure;
an interchangeable depth plate coactable with said depth stop arm;
an interchangable space plate removably fittable to said lower movable frame assembly for coacting with said space stop arm;
a stylus portion provided on said fixed frame structure for measuring the serrations of said pattern key; and
means for translating said measurement into mechanical motion for adjusting said depth plate.

* * * * *